United States Patent
Hughes et al.

(10) Patent No.: US 7,253,398 B2
(45) Date of Patent: Aug. 7, 2007

(54) SENSOR SYSTEM WITH IMPROVED OPERATOR INPUT DEVICES

(75) Inventors: Michael R. Hughes, Brookline, NH (US); Thomas M. Sommer, Groton, MA (US)

(73) Assignee: Flir Systems Inc., North Billerica, MA (US)

(*) Notice: Subject to any disclaimer, the term of this patent is extended or adjusted under 35 U.S.C. 154(b) by 0 days.

(21) Appl. No.: 10/897,180

(22) Filed: Jul. 22, 2004

(65) Prior Publication Data

US 2006/0016966 A1    Jan. 26, 2006

(51) Int. Cl.
*H01J 5/02* (2006.01)
(52) U.S. Cl. .................... 250/239; 250/208.1
(58) Field of Classification Search ............... 396/427; 348/143; 250/239, 208.1, 221
See application file for complete search history.

(56) References Cited

U.S. PATENT DOCUMENTS

| | | | |
|---|---|---|---|
| 4,946,367 A * | 8/1990 | Nakamura | 425/526 |
| 5,781,180 A * | 7/1998 | Couch et al. | 345/161 |
| 5,841,425 A | 11/1998 | Senz, Sr. | |
| 6,274,868 B1 | 8/2001 | Hall et al. | |
| 6,359,681 B1 | 3/2002 | Housand et al. | |
| 6,392,692 B1 * | 5/2002 | Monroe | 348/143 |
| 6,486,868 B1 | 11/2002 | Kazarian | |
| 6,538,636 B1 | 3/2003 | Harrison | |

OTHER PUBLICATIONS

Photograph of prior art hand held control unit by WESCAM showing that the angle between the handle longitudinal axis and the control panel is more than 180 degrees.

* cited by examiner

*Primary Examiner*—Que T. Le
(74) *Attorney, Agent, or Firm*—Edward L. Kelley; Invention Management Associates

(57) ABSTRACT

A sensor system includes a sensor payload (20) capable of generating image signals, an electronic control unit (ECU) (40) for controlling the sensor payload and a hand held control unit (80) in communication with the ECU for use by an operator to input control commands to the ECU. The hand held control unit (80) includes a front facing control panel surface (84) having control elements distributed thereon and an orthogonally disposed bottom surface (94). A handle (96) extends from the enclosure bottom surface (94) with the handle longitudinal axis disposed at an angle (A) of between 175 and 135 degrees with respect to the control panel surface (84). In a second embodiment, the senor system includes a lap top control unit (LCU) (300) reconfigurable by an operator to swap movable control module (312, 306) from a base unit left side receiving port (320) to a base unit right side receiving port (318) to accommodate both left and right-handed users.

33 Claims, 9 Drawing Sheets

SENSOR SYSTEM WITH IMPROVED OPERATOR INPUT DEVICES

BACKGROUND OF THE INVENTION

1. Field of the Invention

The present invention relates to a turret or gimbal mounted camera system and particularly to novel improvements to input devices, used by a dedicated operator to control the pointing direction and other operating characteristics thereof.

2. Description of the Prior Art

In law enforcement, public safety, military and security missions, airborne camera systems may be used for search, surveillance or reconnaisance operations. Camera systems used for these missions may be attached to a helicopter or a fixed wing aircraft or to various other manned or unmanned aircraft or may be positioned in a fixed point with a view of a target area. In many of these applications, a dedicated operator may use a hand-held control unit (HCU), e.g. in smaller cockpits such as a helicopter, or a laptop control unit (LCU), e.g. in larger aircraft enclosures, to control the pointing direction and other aspects of the camera system. In general, the airborne camera system includes a display device so that the dedicated operator is able to view camera images being displayed thereon in real time. As a result, an operator will generally learn to use HCU and LCU devices without looking at the controls. It is therefore important that HCU and LCU devices provide easily actuated control elements that are tactilely intuitive in nature. As will be recognized by the skilled in the art, a dedicated operator may also use HCU and LCU devices to remotely control the pointing direction and other operating characteristics of any sensor or emitter system.

While some aspects of camera operation can be automated, e.g. focus, gain, contrast, brightness and pointing direction, it is often the case that the dedicated operator makes adjustments to camera characteristics. Common manual adjustments may include changes in the system field of view, pointing direction, gain, contrast, or brightness in order to refine any displayed images as may be required for inspecting specific image features and or to improve human interpretation of an image. To do so, the operator manipulates various actuators or tactile control elements incorporated into the HCU or LCU and it is often the case that the operator is required to maneuver one or more tactile control elements using fine hand and finger motions for extended periods, e.g. up to eight hours consecutively. In addition, the HCU and LCU may include other actuators for controlling other devices associated with the camera system such as a recording device, a laser rangefinder, an illuminator, or weapons fire controls. Accordingly, efforts have been made to develop HCU and LCU models that are lightweight, easy to understand and operate without looking at the controls and that do not cause the hands to become fatigued or to suffer from repetitive motion stress disorders over long periods of use.

In one prior art example, an HCU made by FLIR Systems of Billerica Mass., USA is contoured to fit the shape of an operators hand and includes a hand strap for attaching the HCU to the operators hand during use. The contoured shape of the device and the strap eliminate the need for a separate handle and allows the operator to loosely grip the HCU during use and this reduces hand fatigue. However, the FLIR HCU is limited to right-handed operation only and therefore may be uncomfortable and difficult to use for a left-handed person.

In another prior art example, a HCU made by WESCAM, a division of 3-COMM of Ontario Canada, includes a cylindrical handle portion that extends downward from an enclosure that houses control elements and provides a control panel surface that can be actuated by the thumb of the gripping hand. In this example, the operator supports the cylindrical handle in the palm of the hand and uses the thumb to actuate control panel elements. The handle also includes a trigger style actuator incorporated on a backside thereof for actuation by the index finger or middle finger. The WESCAM HCU is usable in either the left or right hand so that a left-handed user is not inconvenienced. While the WESCAM model addresses the needs of the left-handed user, it does not take into account a number of different considerations, particularly, the handle shape, size, weight, working angle with respect to the control panel, and the materials used to form the handle which can all be adjusted to improve the usability of the HCU and to reduce operator fatigue over long use periods. These considerations are addressed by the present invention.

LCU devices are generally larger and more functional than the hand-held HCU devices. The LCU is generally used in fixed wing aircraft where there is more room for the operator to work, however a fixed wing aircraft tends to fly at considerably higher altitudes than a helicopter. The impact of increased altitude is that imaging a target or object on the ground from a high altitude can be more demanding and may require even finer hand control motions to direct the camera pointing direction and to select particular image features of interest and to control zoom characteristics of the camera system to zoom in on the target or object. To accommodate the need for finer control, a LCU may include a larger joystick control element for controlling the pointing direction and a smaller joystick control element for controlling the camera zoom or field of view characteristics. In addition, the LCU will generally have more control elements incorporated into the control panel such pointing direction fine adjusting elements or automatic object tracking or automatic scanning features.

In one prior art example, an LCU made by FLIR Systems of Billerica Mass., USA comprises a unitary laptop device that is divided into three separate control panels. A right control panel includes a large joystick for operation by the right hand of the operator. A left control panel includes a small joystick for operating the camera zoom features and also includes a plurality of other control elements, and these are operated by the left hand of the operator. In addition, a center control panel includes rotatable knobs for making fine adjustments to the pointing direction as well as other control element and the control elements of the center panel may be operated using either the left or the right hand. However, the FLIR LCU is limited to right-handed operation of the large joystick and left-handed operation of the small joystick and therefore may be uncomfortable and difficult to use for a left-handed person.

The applicants have recognized the need to make input devices that increase the comfort of the user and reduce hand fatigue during operation. In addition, applicants have recognized the need to make input devices that would accommodate both the right-handed and the left-handed users equally. They have invented a new system with all users' long-term comforts in mind. These novel input devices have been made comfortable for users due to either the grip of the hand on the device, or their being easily configurable for both right and left-handed use.

SUMMARY OF THE INVENTION

The present invention is an input device for operating a sensor/emitter payload. The input device is ergonomically designed, allowing either an easier grip of the device, or the ability of right-handed or left-handed users to manipulate actuators of the device with equal skill and comfort. In particular, a hand held control unit (HCU) for use by an operator to input control commands comprises an enclosure for housing input control actuators, and a handle extending from the enclosure. The enclosure includes a control panel surface having one or more control actuators protruding therefrom for actuation by a thumb of an operator while the operator grips the handle. The handle includes a longitudinal axis that forms an angle the control panel surface of between 180 and 135 degrees and preferably the angle is 161 degrees. The handle is contoured with an ovoid shape and over coated with a foam material to provide a more comfortable grip over extended use.

In a second embodiment, an input device for controlling the sensor/emitter payload comprises a lap top control unit (LCU) that is reconfigurable by an operator to swap control elements from a left side to a right side to accommodate both left and right-handed users.

DETAILED DESCRIPTION OF THE PREFERRED EMBODIMENT

The present invention includes two input devices. The first input device is a hand-held control unit (HCU) and the second input device is a laptop control unit (LCU). The HCU is an improvement over former models that are held by users by a cylindrical handle. A human grip is not perfectly round, and a cylindrical handle tends to cause fatigue in a user's grip. The present invention seeks to improve operator comfort and reduce fatigue by providing an HCU that includes a contoured handle shaped to more closely match the shape of the grip of an operator. Moreover, the improved handle is hollow to reduce its weight, it is covered by a compliant material to improve operator comfort, and it is attached to the control unit at a working angle that allows the HCU to be balanced in the hand of the operator and this allows an operator to grip the HCU more loosely during operation.

The second input device of the present invention comprises a laptop control unit, (LCU) that can be quickly configured by the operator for use by a left or a right-handed user. The LCU can undergo a stable but non-permanent change to make it more comfortable for one versus another.

Figure 1:
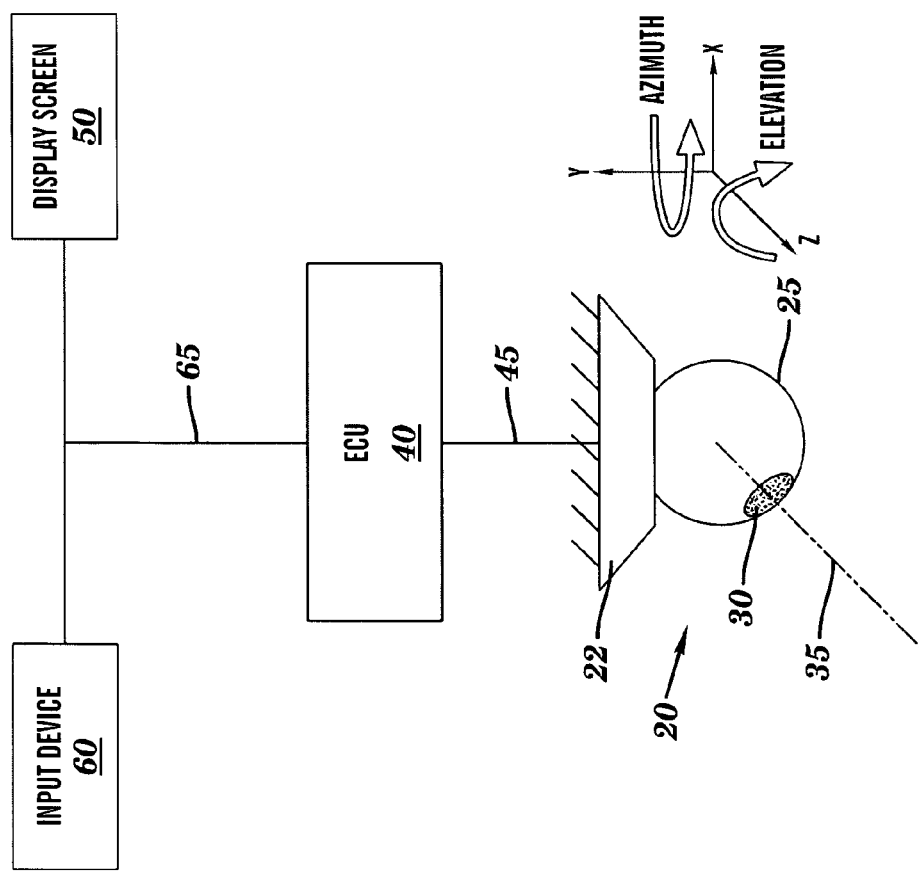
FIG. 1 depicts a schematic representation of an airborne camera system according to the present invention.

FIG. 1 depicts a block diagram of a sensor/emitter system 10 according to the present invention. The sensor/emitter system 10 includes a sensor or emitter payload 20 and may include both sensors and emitters. The payload 20 is packed inside a ball 25 and the ball 25 is rotatable in two axes by a supported turret or gimbal style mount. The turret includes a mounting bracket 22 that fixedly mounts to an external surface of an aircraft or of any other vehicle and may mount to fixed elements such as a pole or building rooftop.

The sensor or emitter payload 20 may include one or more sensor types, e.g. visible, infrared, or other sensors sensitive to other radiation bands. The payload 20 may include a laser emitter for laser range finding or other illuminating devices. In short, the payload 20 may, include any type of electromagnetic energy sensing or emitting system, including an antenna or a microphone. In addition, portion of the payload 20 may be housed in more than one ball turret controlled by an input device of the present invention. In general, each sensor or emitter system of the payload 20 includes a field of view, which may be adjustable, and a line of sight or pointing direction that is substantially coincident with the center of the field of view.

The ball 25 is configured with one or more apertures 30 for receiving or emitting radiation therethrough and each of the sensing or emitting devices included in the payload 20 has its pointing direction generally directed along a coincident axis 35 for pointing at the same location in a far field thereof. In addition, the turret 25 is configured for rotation about two axes with respect to the coordinate system shown in FIG. 1 for directing the pointing direction at a desired target in the far field using rotations in azimuth, (about the Y-axis) and in elevation, (about the Z-axis). In a preferred embodiment of the present invention, the payload includes a low light or image enhanced visible light sensing camera system, an infrared radiation sensing camera system and a laser illuminator for illuminating a target.

An Electronic Control Unit, (ECU) 40 is in communication with the payload 20 via a communication link 45. The communication link 45 may be a hard wired or wireless communication link used to send and receive electrical signals to and from the payload 20. The ECU comprises one or more control systems for controlling the motion of the turret and for controlling each of the sensor or emitter devices of the payload 20. The ECU 40 may include, power supplies, sensor and emitter controls, including automated controls, (e.g. camera auto focus, pointing direction auto tracking, illumination control etc.), a digital image processing system for receiving and manipulating camera images, a Global Positioning Sensing, (GPS) device, image data and program storage devices and a Central Processor Unit (CPU) for coordinating the control thereof. In general, the ECU 40 is housed inside the aircraft or vehicle; however, some or all of the ECU functionality can be included within the sensor emitter payload ball 25 or in some cases may be positioned remote from the aircraft or vehicle such as when the payload is being carried by an unmanned device.

The sensor system 10 also includes an image display device 50 and an operator input device 60, each in communication with the ECU 40 via a communication link 65. In general, the sensors of the payload 20 receive radiation from a scene and form an unprocessed image of the scene. The unprocessed image is communicated to the ECU 40, which processes each image of the scene and sends a processed scene image to the display device 50. The unprocessed image may be reconfigured to place it in a predetermined format suitable for display by the display device 50. In addition, the ECU 40 may also generate and communicate text and graphical images to the display device 50 for display thereon. The ECU 40 may also include systems used to display a cursor on the display device 50 and the position of the displayed cursor may be controllable by an operator using input commands generated at the input device 60. As will be recognized by the skilled in the art, the display screen 50 may be a digital display or an analog display and the display screen 50 may be incorporated within the ECU 40 or within the input device 60. In addition, the display device may project an image formed thereon onto another surface such as may be the case in a heads up display. The ECU may also include or be in communication with various analog and or digital image recording media used for storing or recording images.

In general, a dedicated operator may control various characteristics of the sensor/emitter system 10 using input commands. The input commands are input in response to actuating various switches, joysticks and other electro-mechanical input control elements included on the input device 60. Input commands may be used to control the turret device for changing its pointing direction or to control the functional operation of the sensing and emitting systems incorporated within the payload 20. In particular, the input device 60 may be used to change the field of view or wavelength sensitivity of the payload, to emit a laser or illumination beam, or to control the ECU 40, e.g. for selecting various control features incorporated therein. Such features may include auto tracking a target or automatically controlling the camera gain in response to the level of radiation falling on a sensor. In addition, input commands may be used to configure the display device 50 to display various features as may be required. In addition, images captured by a camera system and displayed on the display device 50, or stored on a recording media, may be still or video images, or may comprise radiation field maps, and the video images will generally be updated or refreshed with new scene images at typical video rates, e.g. more than about 20 frame per second.

Figure 2:
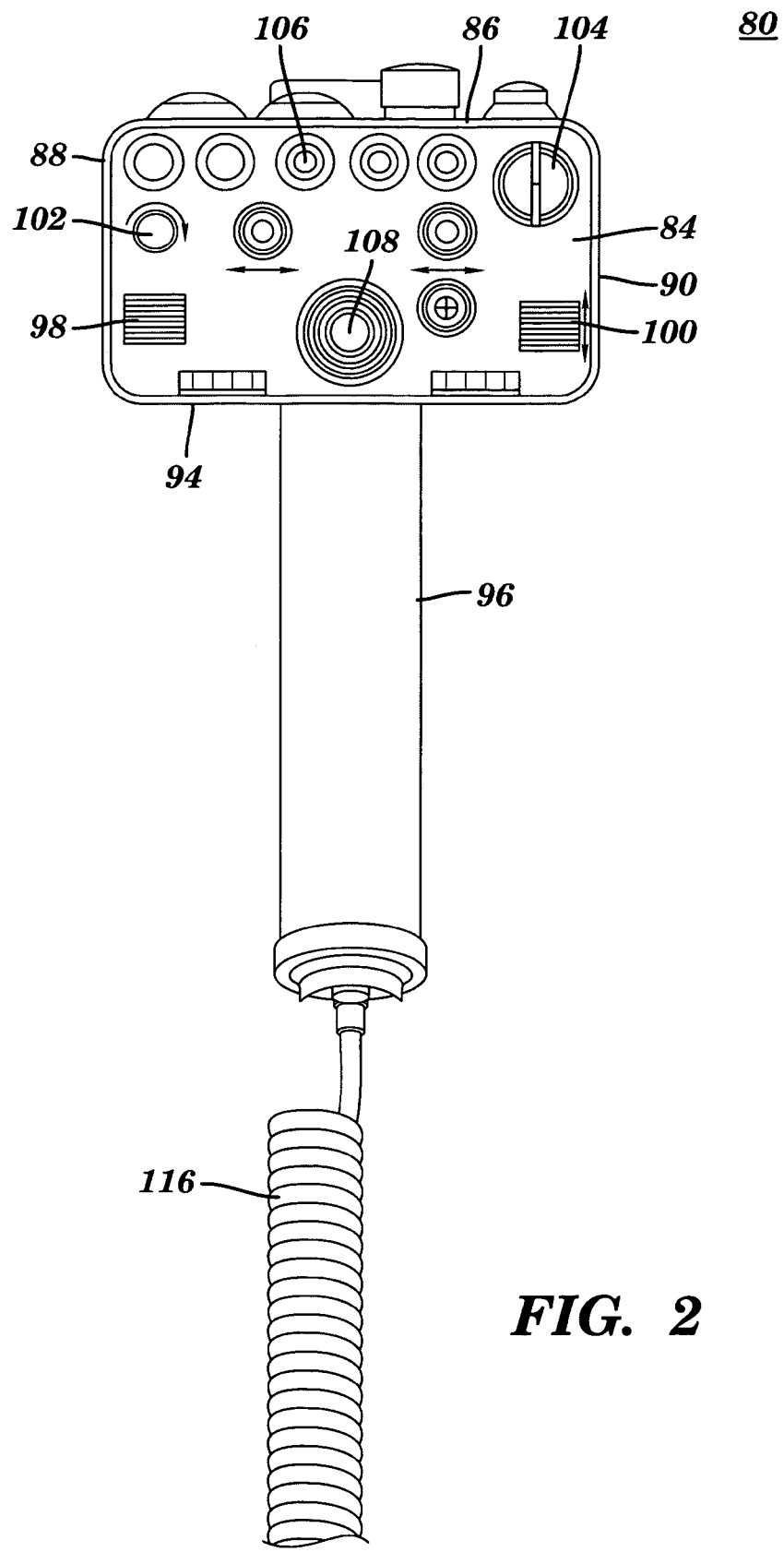
FIG. 2 depicts a control panel face and attached handle for a hand-held control unit, HCU according to the present invention.
Figure 3:
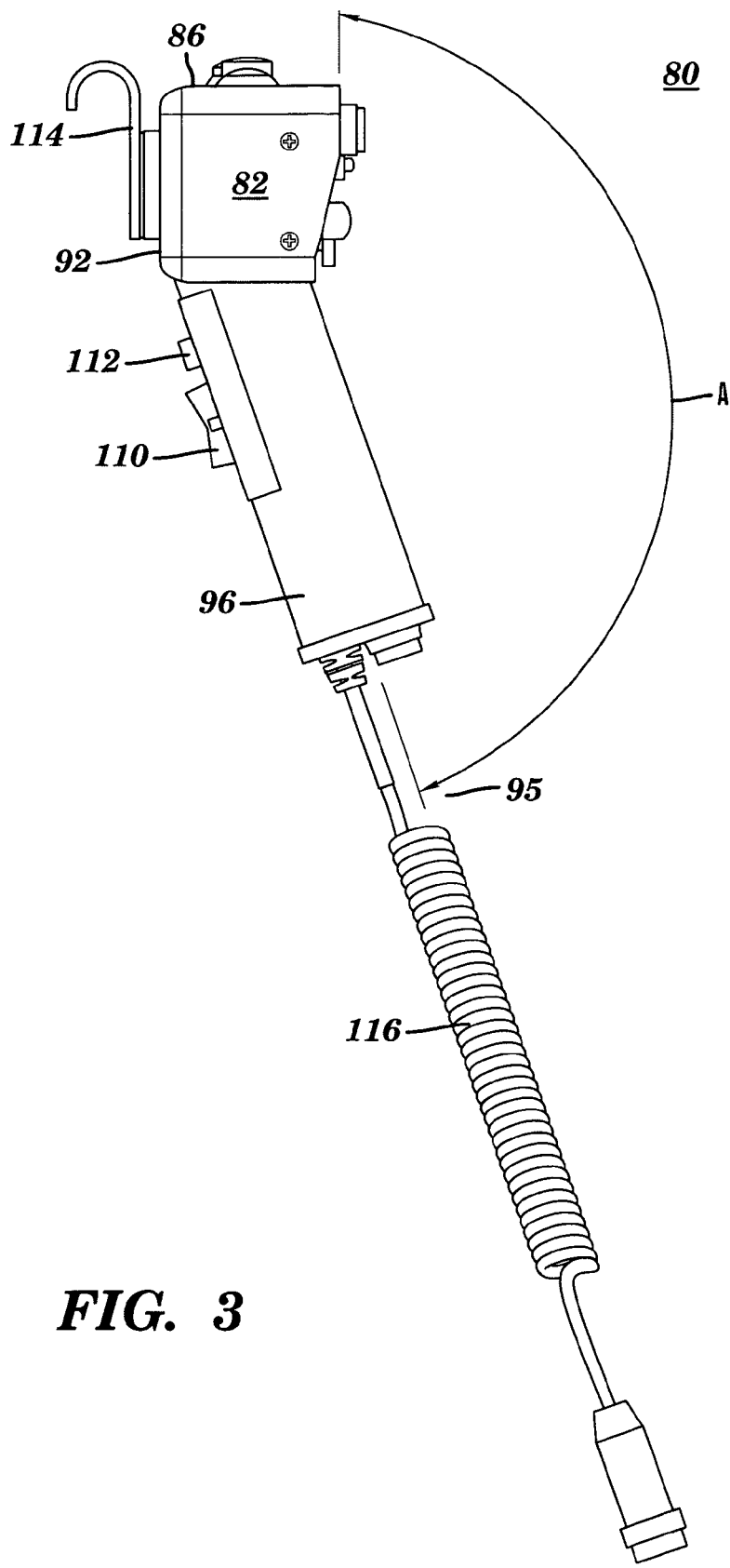
FIG. 3 depicts the side view of an HCU according to the invention.

Referring now to FIGS. 2 and 3 an improved HCU 80 is comfortable and ergonomically accommodating to all users over extended use periods. The HCU 80 comprises a top enclosure 82 formed of lightweight sheet aluminum or other suitable material. The enclosure is hollow for housing electronic elements therein and includes various ports or apertures formed therein through which switches and actuators protrude from the enclosure surfaces for access by the operator. The enclosure 82 includes a front facing control panel 84 having various control elements distributed over its surface, a top surface 86, also having control elements distributed over its surface, side surfaces 88 and 90, a back surface 92 and a bottom surface 94. A handle 96 extends from the bottom surface 94 and provides a gripping surface used by an operator to hold and operate the input device. In particular, the handle 96 constructed to allow an operator to actuate one or more control panel elements using the thumb of the gripping hand. In addition, the control panel 84 may be backlit or otherwise illuminated, or some or all, of the control elements may be illuminated for ease of use in a low light environment.

As shown, in FIG. 2, the HCU 80 provides controllers necessary for controlling various characteristics of the camera system 10. As an example, a control element 98 provides manual adjustment of the camera system focus. A control element 100 provides manual adjustment of the camera system gain. A control element 102 provides manual adjustment of the slew rate of the turret and a control element 104 provides manual initialization of on-off power and standby mode. A control element 106 provides manual initialization of a menu display on the display device 50. In addition, the HCU includes a two-axis joysticks 108 for manually controlling the pointing direction of the camera or payload system elements in azimuth and elevation. The two-axis joystick 108 is constructed for actuation by the thumb of the gripping hand and is conveniently located in the control panel surface under the thumb of the gripping hand.

Referring to FIG. 3, the HCU handle 96 extends from the enclosure bottom surface 94 and a longitudinal axis of the handle is oriented with and angle A with respect to the face of the control panel 84. The angle A is selected to orient the handle in a manner that places the thumb of a gripping hand over the two-axis joystick 108 while the gripping hand loosely grips the handle 96. Applicants have found that an angle A in the range of 180–135 degrees improves comfort and facilitates thumb access to control elements of the control panel 84 without hand or wrist strain and provides a comfortable angle for viewing the control panel 84 while operating the HCU. However, Applicants have found that the preferred angle A is approximately 161 degrees. This is an improvement over prior art HCU devices that oriented the handle with an angle A of more than 180 degrees.

As shown in FIG. 3, other actuators are positioned on the backside of the handle 96. In particular, a two-direction trigger style actuator 110 protrudes from the backside of the handle 96 in a location for convenient actuation by a middle finger of the operator while loosely gripping the handle 96 in the gripping hand. In the present example, the trigger actuator 110 is a zoom actuator used to control the size of the field of view of the payload system by controlling the magnification of a zoom lens associated with a payload camera. Another push button style actuator 112 protrudes from the backside of the handle 96 in a location for convenient actuation by an index finger of the operator while loosely gripping the handle 96 in the gripping hand. The actuator 112 may control the initiation of image recording or illumination of other convenient but frequently used control feature. Thus according to a further aspect of the invention, the HCU includes one or more actuators on the backside of the handle 96. The fingers of the operator can comfortably actuate the backside actuators (110, 112) while loosely gripping the handle 96 in the gripping hand and while actuating other elements of the control panel 84 using the thumb.

The HCU 80 of the present invention includes further control actuators protruding from the enclosure top surface 86. These may include control elements that are less frequently used or that may require a safety lock such as a laser fire control actuator. In addition, a hook 114 is attached to the enclosure back surface 92 and allows the HCU 80 to be hung from a mating storage hook within reach of the operator when it is not in use. In operation, an operator loosely grips the HCU by the handle 96 in either the left or the right hand. The primary controls used by the operator of an airborne camera system tend to be the pointing direction control and the zoom control. For that reason, the pointing direction control and the zoom control are placed in convenient and comfortable locations. In the present example, the two-axis joystick 108 controls the pointing direction and the joystick 108 is positioned directly under the thumb of an operator loosely gripping the handle 96. The zoom control 110 controls the camera field of view and the zoom controller 110 is positioned directly under the middle finger of an operator loosely gripping the handle 96. In addition, the third most used control element 112 is positioned under the index finger of an operator loosely gripping the handle 96. Thus according to a further aspect of the present invention, the three primary control elements of the HCU are located in a comfortable position for easy access while holding the handle 96 and can be easily actuated without looking at the HCU 80.

The thumb of the gripping hand may also be used to easily actuate other actuators such as the actuator 98 used for manual focus adjustment and the actuator 100 used for manual gain adjustment since these actuators are positioned in a location that is easy reached by the thumb without the need to look at the control panel 84. As with the three primary actuators, the next most frequently used actuators are placed for easy access by the thumb without looking at the control panel. In addition, the operator may use the non-gripping hand to actuate other control elements protruding from the control panel 84 or to actuate control elements protruding from the top surface 86.

The HCU 80 also includes a wire and connector 116 that interfaces with the ECU for communicating control signals thereto. The wire and connector 116 exit the base of the handle 96 to avoid interfering with the grip of the operator. The wire is self-coiling so that the operator may freely move the HCU 80 to various positions within the cockpit or enclosure without worrying about the wire being tangled or snagged. In other embodiments described below, the HCU 80 and the ECU 40 may include transmitting and receiving elements for communicating control signals between the two devices using a wireless communication link.

Figure 4:
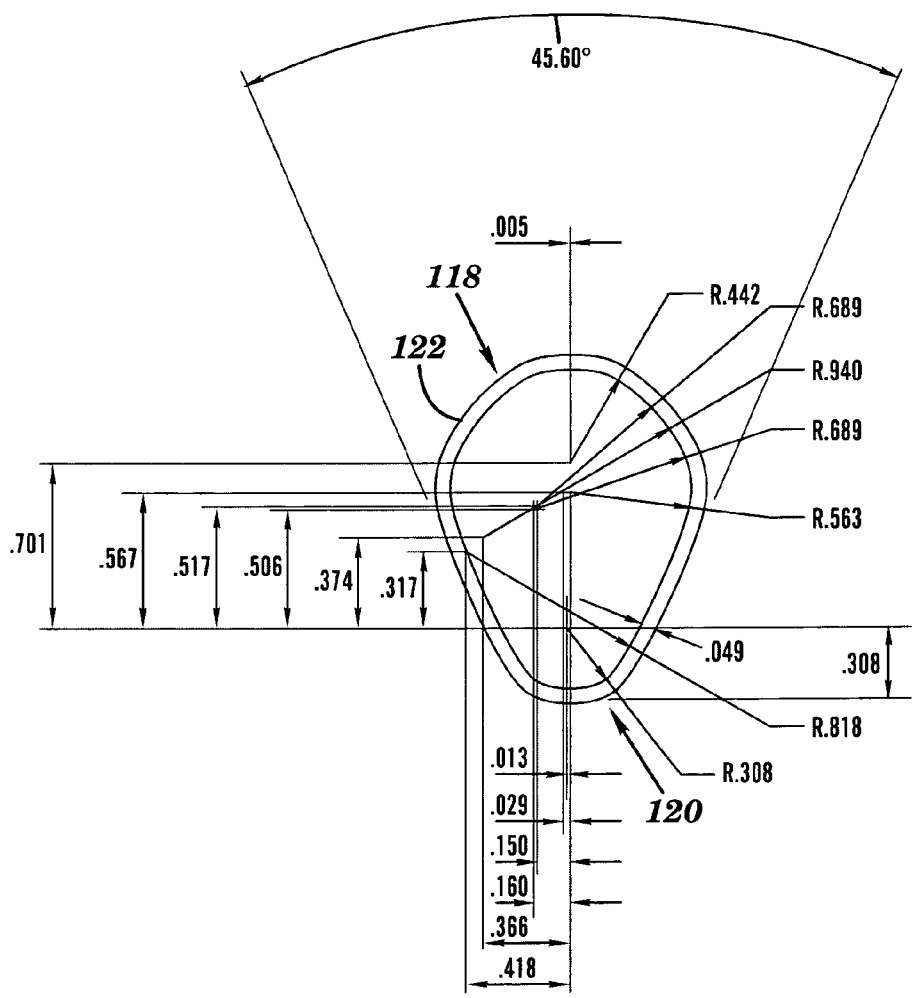
FIG. 4 depicts a detailed view of a cross-section of an HCU handle according to the invention.

According to a further aspect of the present invention, the HCU handle 96 is formed with a contoured cross-section for fitting comfortably in the gripping hand and for easily supporting the HCU device using a loose grip. In particular, the cross-section of the handle 96 is substantially ovoid in shape having a broader portion 118 and a narrower portion 120. FIG. 4 depicts the cross-section of the handle 96. The user holds the ovoid handle 96 with the narrow portion 120 placed against the intersection of the palm and fingers of the gripping hand and the broader portion 120 facing away from the palm of the gripping hand. Accordingly, the handle 96 is attached to the enclosure 82 with the broader portion 118 facing toward the control panel 84. While previous designs have had perfect cylinders as handles, in designing the current input device, it was taken into account that the grip of a user's hand is not perfectly round. Therefore, this design assures a comfortable grip for the user, as handle 96 can be more comfortably gripped because of its ovoid shape. In particular, the narrow portion 120 allows the finger of the gripping hand to contact a larger surface area so that the present handle does not require a tight grip to hold it during use. A further benefit of the handle ovoid cross-section is that the narrow portion 120 improves access to the controller actuators 110 and 112, placed on the backside of the handle 96, by allowing the fingers to be more relaxed while gripping the handle. Moreover, different users having different hand sizes can use the improved HCU more comfortably because a small or a large hand easily grips the narrow portion 120.

One example of an ovoid cross-section usable for the handle 96 is shown in detail in FIG. 4. The handle cross-section is formed from a thin walled hollow tube 122 which is initially circular in cross-section but which is formed into an ovoid shape using know forming methods. However, the tube shape may be extruded, molded, or otherwise formed from numerous suitable materials, e.g. aluminum, steel, plastic or from composites. In addition, when forming the thin walled tube 122, the tube is cut at the angle A with respect to its longitudinal axis so that it can be attached to the enclosure 82 and extends therefrom at the angle A as shown in FIG. 3.

Figure 5:
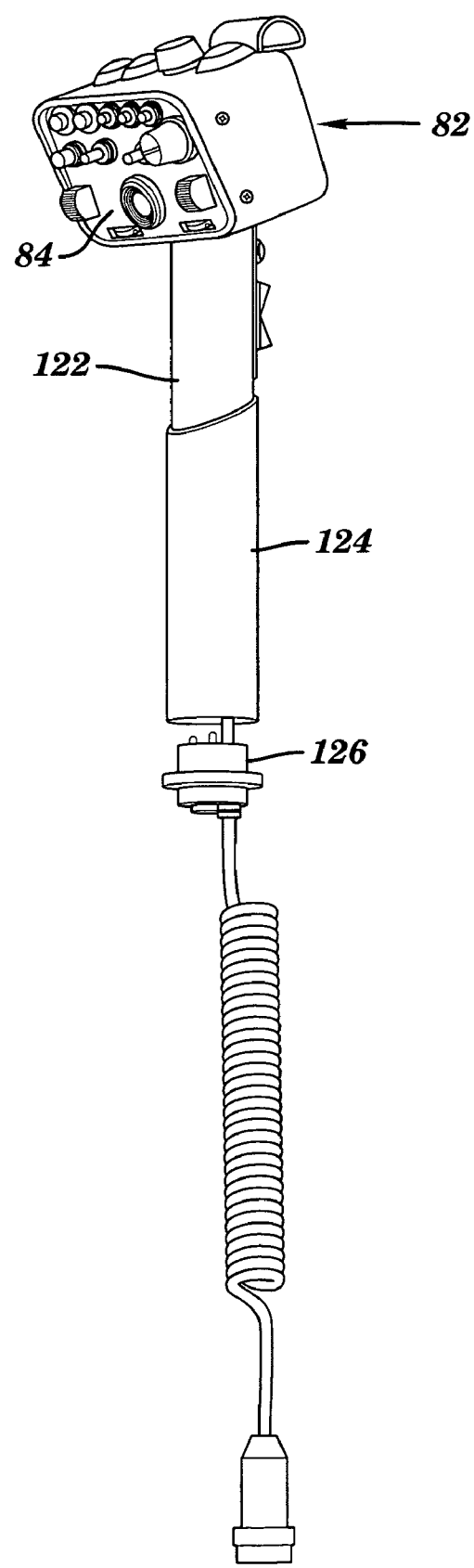
FIG. 5 depicts an exploded view of an HCU handle assembly according to the invention.

Turning now to FIG. 5, the handle 96 is shown partly assembled for clarity. The thin walled tube 122 is attached to bottom surface 94 of the enclosure 82. The broader handle portion 118 faces the control panel 84. The backside of the thin-walled tube 122 includes the backside actuators 110 and 112 attached thereto and protruding therefrom. In addition, a handle cover 124 is shown partly installed onto the thin walled tube 122. The handle cover 124 comprises a cylindrical thin walled hollow tube formed from a PVC foam. The cylindrical handle cover 124 is installed over the thin-walled tube 122 and in doing so; it conforms to the ovoid shape of the thin-walled tube 122. The handle cover 124 extends over the full length of the thin-wall tube 122, when fully installed, and may be cut away to expose the backside actuators 110 and 112.

The PVC foam of the handle cover 124 provides several desirable properties including a higher friction coefficient than that of the thin walled tube 122 to prevent slipping of the handle in the operator's hand. In addition, the PVC foam is compliant and therefore conforms to the grip of the operator during use. However, the PVC returns to its original shape after the operator releases his or her grip. In addition, the foam may provide electrical and thermal insulating properties to prevent electrical shock and to reduce thermal energy transfer to or from the operator's hand. The foam may also absorb sweat and excess moisture that may cause the handle to become slippery and the excess moisture will evaporate when the handle is not in use.

In a further aspect of the improved HCU according to the invention, the weight and symmetry of the longitudinal axis of the HCU 80 are balanced around the users grip. In particular, the weight and weight distribution of the enclosure 82 and its components are balanced by the weight and weight distribution of the handle 92 using the users grip location as the balancing point. In one example, balancing can be accomplished by adjusting the weight of an end plug 126, shown in FIG. 5, used to seal the handle 92. In addition to the features described above, the HCU enclosure 82 and any other aluminum parts may be covered by a surface coating, e.g. anodize or paint, to prevent oxidation and scratching. In addition, the entire HCU may be formed with appropriate gaskets and seals installed to surround all apertures and openings to make the unit watertight, and to prevent any contaminants from entering the enclosure 82.

Thus according to a preferred embodiment an improved HCU 80 comprises, a hollow ovoid shaped thin walled tube over coated with a compliant foam material to form a comfortable handle 92. The handle 92 is attached to an enclosure 82 at an angle A that provides a comfortable angle for holding the HCU in the hand for extended periods and for viewing the HCU control panel as may be required. The HCU is configured to provide the most frequently used user controls in convenient and comfortable locations. In particular, a two-axis thumb actuated joystick 108 is placed on the control panel 84 under the thumb of the gripping hand and one or more actuators 110 and 112 are placed on the backside of the handle 92 under the fingers of the gripping hand. In addition, the HCU 80 is usable in either the left or the right hand by a small or a large hand without reconfiguration or inconvenience and the HCU 80 is substantially balanced about the grip of the user to prevent strain on the hand or wrist during extended use.

Lap Top Control Unit:

As described above, a second input device according to the present invention comprises a laptop control unit, (LCU). The LCU may replace the HCU in the sensor/emitter system 10, shown in FIG. 1. The LCU is larger than the HCU and may include additional and larger actuators than the HCU and these larger actuators usually allow the operator to input more precise and stable tactile control motions. In addition, the operator is more likely to operate LCU actuators using both hands simultaneously. As with the HCU, it is desirable that the LCU controls be easily and comfortably actuated for long periods without looking at the LCU, and that the position of the most frequently used controls be in the most accessible and comfortable locations. According to the present invention, an improved LCU is reconfigurable by the user for use by a left or a right-handed user.

Figure 6:
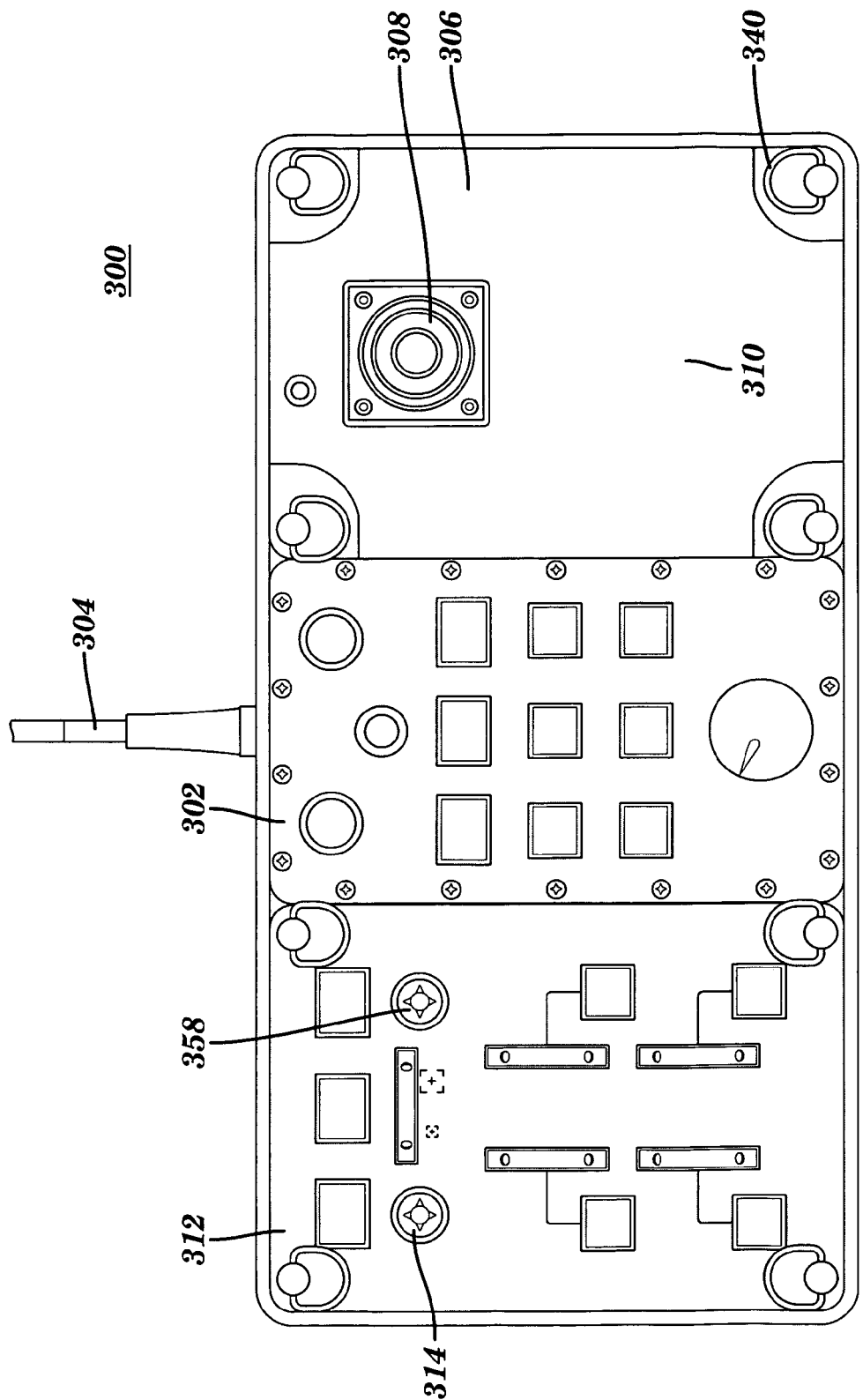
FIG. 6 depicts a control panel face for a laptop control unit, LCU, according to the present invention.

Turning to FIG. 6, a top view of a laptop control unit (LCU) 300 according to the present invention shows its control panel. The LCU 300 includes three separate control panel modules. A fixed control panel 302 is positioned in the center of the LCU, and connected directly to electronic control unit 86, (ECU), via cable 304. The LCU 300 also includes a joystick module 306, shown on the right side in FIG. 6, and the joystick module 306 includes a single two-axis joystick actuator 308 extending vertically upward therefrom. The joystick actuator 308 controls the pointing direction of the sensor/emitter system 10 and is the primary control of the LCU 300. In the configuration shown in FIG. 6, the right hand of the operator operates the joystick actuator 308.

The joystick module 306 includes a large area of unobstructed rest space 310 used by the operator to rest and steady the hand and wrist while operating the joystick 308. The rest space 310 helps to steady the operator's hand and this allows the operator to use finer and more coordinated hand motions to control the joystick 308. The finer and more coordinated hand motions are particularly desirable for high altitude camera work, which usually requires more precise pointing and zoom control than is required for low altitude camera work.

The third control module of the LCU is a zoom control module 312, shown on the left side of FIG. 6. The zoom module 312 includes a plurality of control actuators for controlling various characteristics of the camera system but the primary control element of the zoom module 312 is a two-axis zoom joystick 314 for controlling the field of view or magnification of the camera image. In the configuration shown in FIG. 6, the left hand of the operator operates the zoom joystick 314.

In general, an operator positions the LCU on the lap or thighs and uses both hands to operate various electromechanical actuators while viewing an image displayed by the sensor/emitter system 10 on a display device 50. The operator may look at the LCU to select an actuator for starting or stopping or adjusting a particular function of the camera or payload system but the large majority of the control requires fine motions being input to the pointing direction control joystick 308, by the right hand, and the zoom control joystick 314, by the left hand. However, since the main control elements of the LCU tend to be the input motions to the joystick 308, a left-handed operator may find it difficult to use the right hand to deliver fine coordinated motions to the joystick 308. Accordingly, the LCU 300 is reconfigurable and the operator may swap the locations of the joystick module 310 and the zoom module 312 so that the left hand can operate the pointing direction joystick 308 and the right hand can operate the zoom joystick 314.

Figure 7:
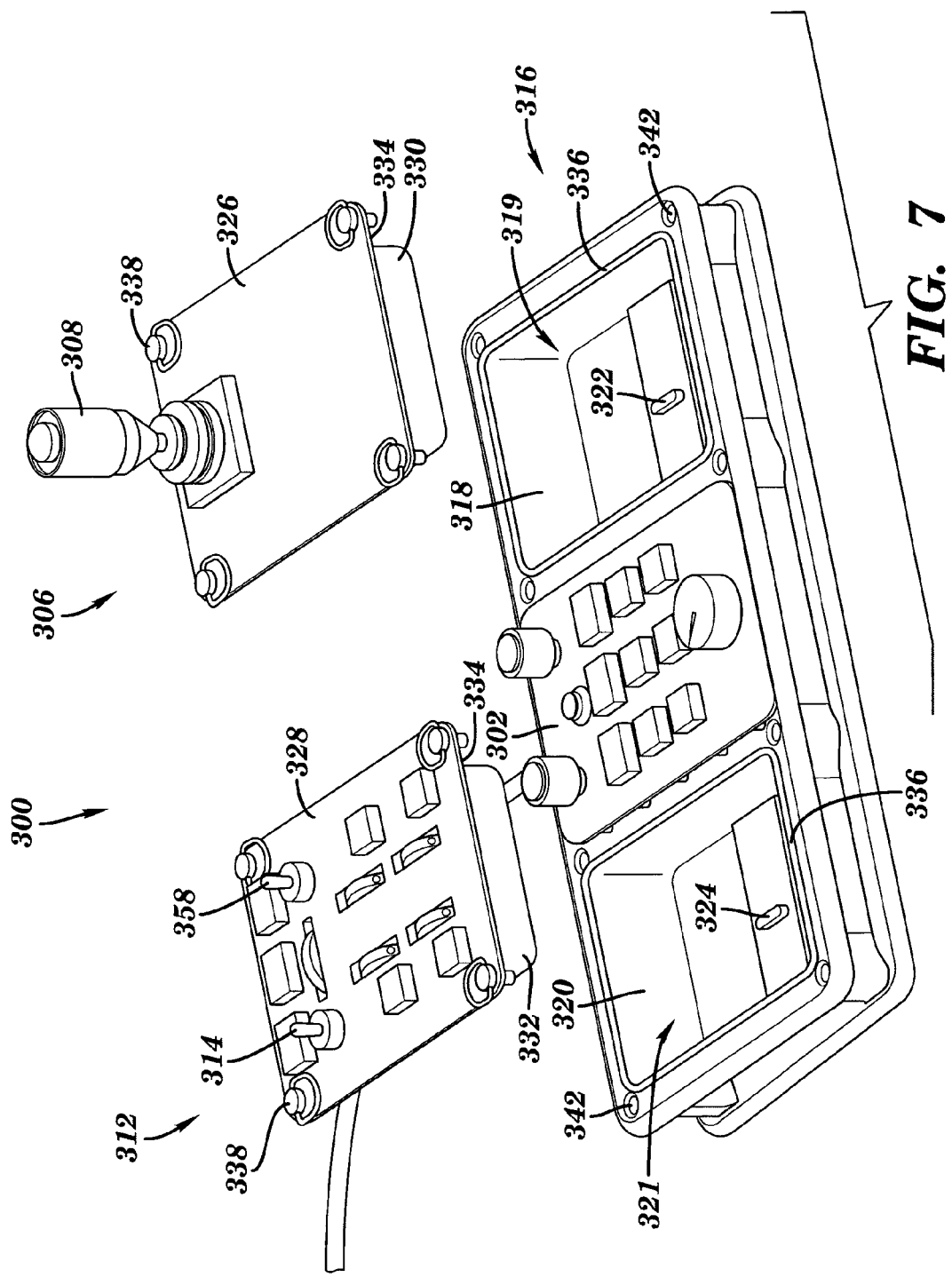
FIG. 7 is a perspective view of the LCU showing two moveable modules in exploded view.

Referring now to FIG. 7, the LCU 300 is shown with the fixed control module 302 fixedly installed in a center location of a base unit 316 and with each of two movable modules, (306 and 312) removed from a left and a right module receiving port 318 and 320 respectively. According to the invention, either of the zoom module 312 or the joystick module 306 can be installed in the left receiving port 318. Conversely, either of the zoom module 312 or the joystick module 306 can be installed in the right receiving port 320.

Each receiving port 318, 320 comprise a recessed empty volume formed in the base unit 316 for receiving a movable control module therein. At the bottom of each receiving port 318, 320, electrical connectors 322 and 324 provide an electrical interface configured to receive either one of the movable modules, i.e. joystick module 306 or zoom module 312, therein. In addition, each of the movable modules 306 and 312 includes an electrical connector protruding from its bottom side, (not shown), that provides an electrical interface configured to be mated with either one of the electrical connectors 322 or 324. At the top of each recessed volume 318 and 320, a receiving aperture 319 and 321 is sized to receive either of the movable modules 306, 312 therein.

The movable modules 306 and 312 each include a flat top plate 326 and 328. Top surfaces of each top plate 326 and 328 form a control panel surface and provide one or more apertures formed therein through which control elements extend. The movable modules 306 and 312 each also includes a sealed enclosure 330 and 332 attached to an underside of each top plate 326 and 328. The sealed enclosures 330 and 332 house the electromechanical actuators and associated interconnecting elements of each control panel. In addition, each sealed enclosure includes an aperture, formed on its bottom side, through which the electrical connector for mating with either of the electrical connectors 322 and 324 protrudes. The sealed enclosures 330 and 332 may also include a sealing gasket positioned between a surface of the sealed enclosure and the underside of the flat top surfaces 326 and 328 to prevent the movable modules from becoming contaminated or damage while they are removed from the LCU.

Each top plate 326 and 328 is sized to overhang the sealed enclosures 330 and 332 on all four sides thereof to provide a mounting flange 334. The mounting flange 334 is sized to overlap the receiving apertures 319 and 321 and provides a surface for latching each of the movable modules 306 and 312 to the fixed base unit 316. In addition, each receiving aperture 319 and 321 is surrounded by a sealing gasket 336, which when compressed by the mounting flange 334, seals the receiving port from contaminants and moisture when a movable module is installed therein.

To fasten the movable modules within each receiving port, four latching mechanisms 338 are captured by each mounting flange 334, with one at each of the four corners. Ideally, the latching mechanisms 338 allow the operator to install or remove each movable module using just the fingers. One example latching mechanism is a quarter turn fastener, which provides a latching pin loosely captured by the mounting flange 334 and rotatable with respect thereto. The latching pin also includes a ring 340 used by an operator to rotate the latching pin. When installing a movable module into a receiving port, the latching pins engage with latching cylinders 342 provided on the base unit 314. The latching cylinders 342 receive each latching pin therein and upon turning the latching pin by a quarter turn, the pin is engaged with a latching device inside the latching cylinder and becomes latched to the base unit 316. The pin becomes unlatched by a quarter turn in the opposite direction.

To remove a movable module 306 or 312 from a receiving port 318 or 320, the operator may turn each of the four pins of the movable module by a quarter turn to disengage the pins from the cylinders 334. Once unlatched the movable module is pulled vertically to disconnect it from the electrical connector 322 or 324 at the bottom of the receiving port and to remove the module from the LCU. With both of the movable modules 306 and 312 removed, their positions may be swapped and the modules can be reinstalled in reverse order. Accordingly, an operator is able to swap the location of the joystick model 306 and the zoom module 312 to accommodate the desired positions of the modules by the operator.

Figure 8:
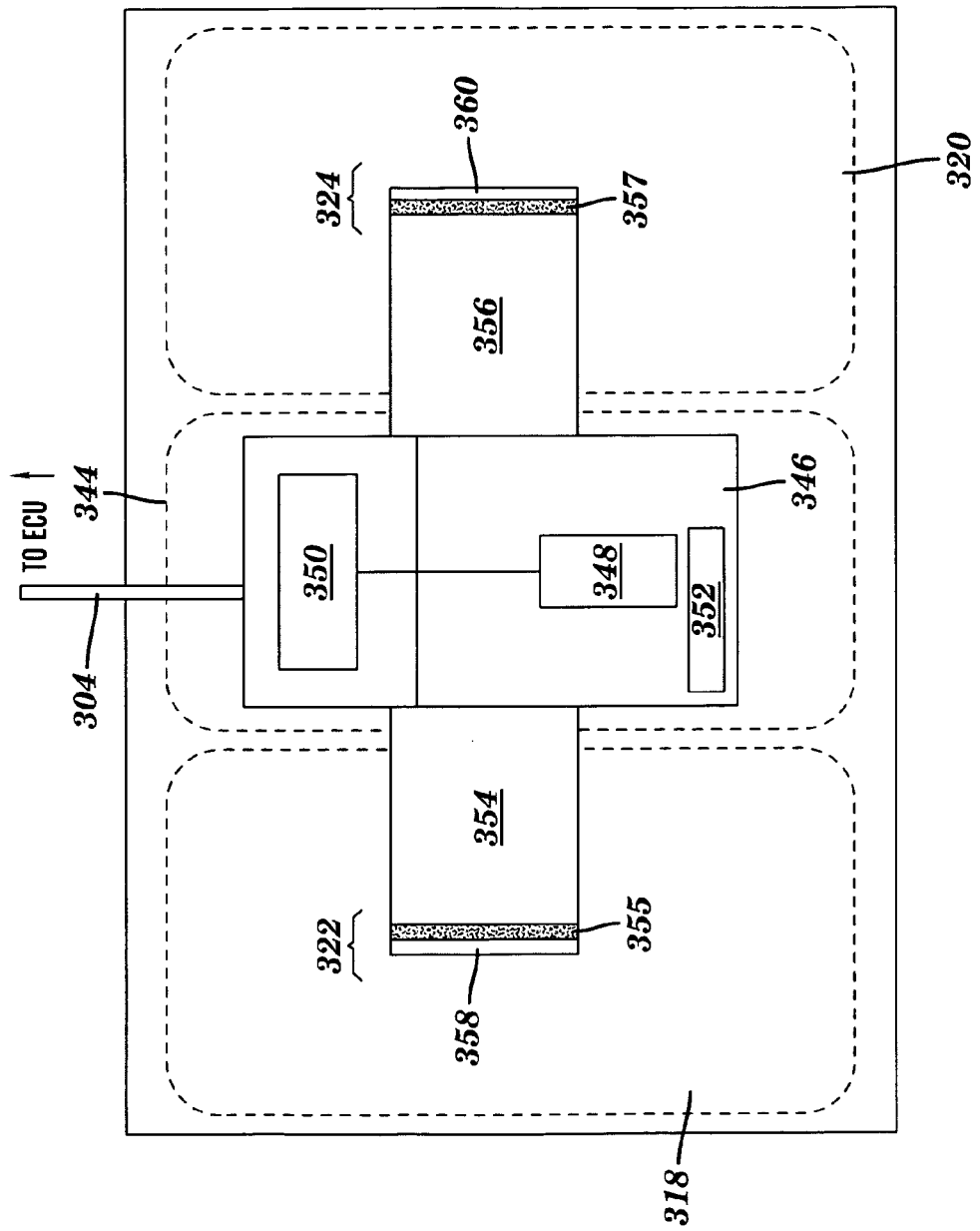
FIG. 8 depicts a schematic representation of electrical connecting elements of the LCU.

Referring now to FIG. 8, the LCU electrical connections are shown schematically in a top view with each of the module receiving ports shown in phantom view. As shown, the electrical connectors 322 and 324 are visible at the bottom of each of the left and right receiving ports 318 and 320. At the bottom of a center receiving port 344, which receives the fixed control panel 302 therein, is a Printed Circuit, PC board 346, or other equivalent electrical interface element, for controlling the functions of the LCU. The PC board 346 may include a central processor, (CPU) 348, a power distribution network, not shown, a communications interface 350 for providing the necessary communications to and from the ECU, via the cable 304, or via a wireless interface, and an interface to each of the actuator modules of the LCU. In particular, the PC board 346 may interface with the fixed control panel 320 via a multi-element connector 352. In addition, the PC board 346 communicates with each of the electrical connectors 322 and 324 via ribbon cables 354 and 356.

According to a further aspect of the present invention, each of the electrical connectors 322 and 324 is a multi-port female connector having two or more times the number of ports as may be needed by either one of the movable modules 306 and 312 alone. Similarly, the mating connector protruding from the bottom of each movable module 306 and 312 is a multi-pin male connector having a matching number of pins with the ports of the female connectors 322 and 324 but with only a portion of the pin locations being populated.

In a preferred embodiment, each connector 322 and 324 is a 51-pin connector configured with up to 25 pins or ports connected to receive signals from the joystick module 306 and to communicate only those signals received from the joystick module 306 to the PC board 346. Similarly, each connector 322 and 324 is configured with up to 25 pins being connected to receive signals from the zoom module 312 and to communicate only those signals received from the zoom module 312 to the PC board 346. As shown in FIG. 8, the connectors 322 and 324 are divided into right and left halves with the right halves labeled 354 and 356, and shown in solid black. Each right half 354 and 356 is configured to interface with the joystick module 306 and each left half 358 and 360 is configured to interface with the zoom module 312. In addition, the mating male electrical connector protruding from the base of the joystick model 306 is populated with pins only on its right side while the mating male electrical connector protruding from the base of the zoom module 312 is populated with pins only on its left side. As a result, the joystick module 306 can be installed into either receiving port 318 or 320 and communicate with the PC board 346 via the connector right sides 354 or 356. Moreover, the zoom module 312 can be installed into either receiving port 318 or 320 and communicate with the PC board 346 via the connector left sides 358 or 360.

In one exception to the above-described configuration, the zoom module 312 includes two substantially identical zoom joysticks; a right zoom joystick 314, and a left zoom joystick 358, positioned on the left and right sides thereof. According to the preferred embodiment of the invention, only one of the left and right zoom joysticks 314 or 358 is active for use at a time. In particular, the right side zoom joystick 358 is only activated when the zoom module 312 is installed in the right receiving port 320 and the left zoom joystick 314 is only activated when the zoom module 312 is installed in the left receiving port 318. Accordingly, when the zoom module 312 is installed on the left side of the LCU, an operator will maneuver the left zoom joystick 314 using the left hand and when the zoom module 312 is installed on the right side of the LCU, an operator will maneuver the right zoom joystick 358 using the right hand. Applicants have found that the use of a different zoom joystick by the left or the right hand improves operator comfort and the visibility and accessibility of the other controls of the zoom module 312.

According to a further embodiment of the present invention, each of the input devices described above, as well as the ECU, includes a communication interface for communicating command and control signals between the ECU and the input device. The communications interface may format command and control signals in accordance with a standard RS232, RS485 or AR429 serial communication protocol for transmission over a wire connected between the ECU and the input device. Alternatively, wireless ports may be installed into each communication interface for providing wireless transmission between the ECU and the input device.

Figure 9:
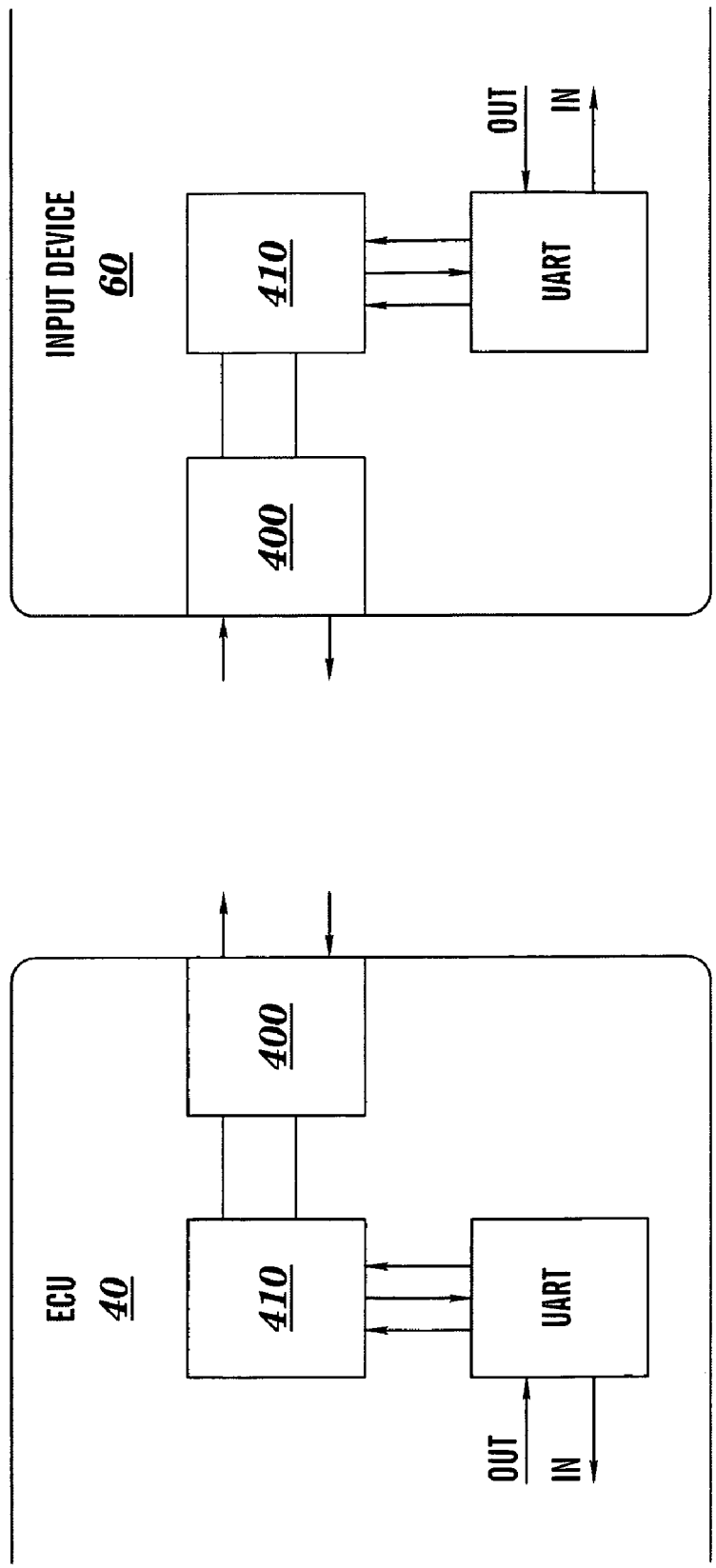
FIG. 9 depicts a wireless communication port according to the present invention.

An example of one embodiment of a wireless communication link between the ECU 40 and an input device 60 is shown schematically in FIG. 9. As shown, the ECU 40 and the input device 60 each include a transceiver device 400. The transceiver device 400 comprises an infrared light emitting diode, LED, emitter for emitting an infrared radiation beam, and an infrared receiving photodiode (PIN), for generating an electrical signal in response to infrared radiation falling thereon. Such transceivers are well known and are commercially available from Texas Instruments of Dallas Tex., USA.

Connected to each transceiver 400 is an encoder decoder device 410. The encoder decoder device 410 encodes or modulates a signal to be transmitted and drives the output of the LED in accordance with the modulated signal. In addition, the encoder decoder device 410 decodes or demodulates any signals generated by the PIN in response to an infrared signal received thereby. The encoding and decoding are conducted in accordance with an infrared communication protocol, e.g. Infrared Data Association, (IrDa), or Hewlett Packard Serial Infrared, (HPSIR). An encoder/decoder device suitable for the current invention is commercially available from Texas Instruments of Dallas Tex. by the part number TIR1000.

The encoder/decoder 410 is in communication with a Universal Asynchronous Receiver Transmitter (UART) 420. The UART 420 receives decoded signals from the decoder portion of the encoder/decoder 410 and reformats the signals into a standard serial protocol such as RS232 or the like. Once reformatted, these signals exit the UART 420 as command and control signals. Similarly, the UART 420 converts RS232 or other serial command and control signals received therein into a format that can be readily encoded by the encoder/decoder 410. In addition, the UART 420 emits a clock signal synchronous with the desired communication baud rate to the encoder/decoder 410 for synchronizing the encoding and decoding operation. In addition, the UART 420 may be configured to convert command and control signals to other communication protocols, e.g. a parallel communications protocol or to other serial communications protocols as may be required by the application.

It will also be recognized by those skilled in the art that, while the invention has been described above in terms of preferred embodiments and examples, it is not limited thereto. Various features and aspects of the above described invention may be used individually or jointly. Further, although the invention has been described in the context of its implementation in a particular environment, and for particular applications, e.g. for operating a sensor emitter system, those skilled in the art will recognize that its usefulness is not limited thereto and that the present invention can be beneficially utilized in any number of environments and implementations including but not limited the control of any device by a hand held or lap top input device. Accordingly, the claims set forth below should be construed in view of the full breadth and spirit of the invention as disclosed herein.

What we claim is:

1. A sensor system comprising:
   a sensor payload capable of generating image signals in response to radiation falling thereon, said sensor payload having a field of view from which radiation is received and a pointing direction substantially centered within the field of view, said payload being rotatable about at least one rotation axis for directing said pointing direction onto a radiation scene;
   an electronic control unit in communication with the sensor payload comprising one or more systems for controlling the sensor payload, for directing the pointing direction, and for receiving the image signals from the sensor payload;
   a hand held control unit in communication with the electronic control unit for use by an operator to input control commands to the electronic control unit, said hand held control unit comprising a hollow electronic enclosure for housing input control actuators disposed to protrude through aperture ports passing through the enclosure to provide access to the input control actuators by a gripping hand of an operator and wherein the hollow electronic enclosure comprises a front facing control panel surface having control elements distributed thereon, a bottom surface disposed substantially orthogonal to the control panel surface, and a handle having a handle cross-section disposed along a handle longitudinal axis and wherein the handle extends from the enclosure bottom surface with the handle longitudinal axis disposed at an angle A of between 175 and 135 degrees with respect to the control panel surface.

2. The sensor system of claim 1 wherein said hollow electronic enclosure further comprises:
   a top surface, attached to the control panel surface and disposed substantially orthogonal to the control panel surface and also having control elements distributed thereon,
   two substantially opposing side surfaces attached to the control panel surface and disposed substantially orthogonal to the control panel surface; and,
   a back surface attached to the top surface, the bottom surface and each of the two side surfaces and disposed substantially opposed to and parallel with the control panel surface.

3. The sensor system of claim 1 wherein the handle longitudinal axis is disposed at an angle A of substantially 161 degrees with respect to the control panel surface.

4. The sensor system of claim 1 wherein said handle cross-section is contoured for fitting comfortably in the palm of the gripping hand of the operator and wherein said cross-section is contoured with a narrow portion for resting against the gripping hand at the intersection of the gripping hand palm and fingers and wherein the handle cross-section includes a broad portion opposed to the narrow portion and wherein said handle extends from the enclosure bottom surface with said narrow portion facing away from the control panel surface.

5. The sensor system of claim 4 wherein said contoured cross-section comprises and ovoid cross-section.

6. The sensor system of claim 4 further comprising a joystick disposed on the control panel surface under the gripping hand thumb and constructed for actuation by the gripping hand thumb for controlling a pointing direction of the sensor payload.

7. The sensor system of claim 6 further comprising a first actuator protruding from the handle narrow portion and wherein the first actuator is positioned on the handle for convenient actuation by the gripping hand middle finger.

8. The sensor system of claim 1 wherein said payload sensor further includes a radiation emitter for emitting a radiation beam directed substantially coincident with said pointing direction.

9. The sensor system of claim 1 wherein each of said electronic control unit and said hand held control unit includes a transmitter and a receiver configured for transmitting and receiving command signals between the electronic control unit and the hand held control unit by a wireless communication interface.

10. The sensor system of claim 1 wherein said handle comprises a hollow thin walled inner tube and a compliant foam cover installed over said hollow inner tube and wherein said compliant foam cover is sufficiently compliant to conform to the gripping hand during use and to thereafter return to its original shape.

11. The sensor system of claim 1 wherein said enclosure has a weight and said handle has a weight and further wherein the weight of said enclosure and the weight of said handle are distributed to substantially balance about the gripping hand location on the handle.

12. The sensor system of claim 1 further comprising a display device in communication with the electronic control unit for displaying an image sensed by the sensor payload.

13. A sensor system comprising:
   a sensor payload capable of generating image signals in response to radiation falling thereon, said sensor payload having a field of view from which radiation is received and a pointing direction substantially centered within the field of view, said payload being supported by a turret style mount that provides rotation of the pointing direction in azimuth and elevation for directing said pointing direction onto a desired radiation scene;
   an electronic control unit in communication with the sensor payload comprising one or more systems for controlling the sensor payload, for controlling the pointing direction and for receiving the image signals from the sensor;
   a display device in communication with the electronic control unit for receiving the image signal and displaying images in accordance with the image signals;

a hand held control unit in communication with the electronic control unit for use by an operator to input control commands to the electronic control unit, said hand held control unit comprising an electronic enclosure for housing input control actuators, disposed to protrude through aperture ports passing through the enclosure to provide access to the input control actuators by a gripping hand of the operator and wherein the hollow electronic enclosure comprises a front facing control panel surface having control elements distributed thereon, a bottom surface disposed substantially orthogonal to the control panel surface, and a handle having a handle cross-section disposed along a handle longitudinal axis and wherein the handle extends from the enclosure bottom surface with the handle longitudinal axis disposed at an angle A of between 175 and 135 degrees with respect to the control panel surface and wherein said handle is formed with a contoured cross-section for fining comfortably in the palm of the gripping hand and wherein said contoured cross-section comprises a narrow portion and an opposed broad portion and wherein said handle is attached to the enclosure with the narrow portion facing away from the control panel surface.

14. The sensor system of claim 13 wherein said contoured cross-section comprises an ovoid cross-section.

15. The sensor system of claim 13 wherein said angle A is substantially 161 degrees.

16. The sensor system of claim 13 further comprising a two-axis joystick disposed on the control panel surface under the gripping hand thumb and constructed for actuation by the gripping hand thumb for controlling a pointing direction of the sensor payload in azimuth and elevation.

17. The sensor system of claim 13 further comprising a two-direction trigger style actuator protruding from the handle narrow portion for controlling the size of the field of view of the payload sensor actuator and wherein the two-direction trigger style actuator is positioned on the handle for convenient actuation by the gripping hand middle finger.

18. The sensor system of claim 13 wherein said payload sensor further includes a radiation emitter for emitting a radiation beam directed substantially coincident with said pointing direction.

19. The sensor system of claim 13 wherein each of said electronic control unit and said hand held control unit includes a transmitter and a receiver configured for transmitting and receiving command signals between the electronic control unit and the hand held control unit by a wireless communication interface.

20. The sensor system of claim 13 wherein said handle comprises a hollow thin walled inner tube and a compliant foam cover installed over said hollow inner tube and wherein said compliant foam cover is sufficiently compliant to conform to the gripping hand during use and to thereafter return to its original shape.

21. The sensor of claim 13 wherein said enclosure has a weight and said handle has a weight and further wherein the weight of said enclosure and the weight of said handle are distributed to substantially balance about the gripping hand location on the handle.

22. A sensor system comprising:
a sensor payload capable of generating image signals in response to radiation falling thereon, said sensor payload having a field of view from which radiation is received and a pointing direction substantially centered within the field of view, said payload being supported for rotation about two rotation axes for directing said pointing direction onto a desired radiation scene;

an electronic control unit in communication with the sensor payload comprising one or more systems for controlling the sensor payload, for controlling the pointing direction and for receiving the image signals from the sensor;

a lap top control unit in communication with the electronic control unit for use by an operator to input control commands to the electronic control unit, said lap top control unit comprising:

a first movable control panel module comprising a primary control element extending through a first top plate that forms a first control panel surface, a first enclosure attached to an underside of the first top plate and including a first bottom side formed with a first electrical connector protruding there through;

a second movable control panel module comprising a secondary control element extending through a second top plate that forms a second control panel surface, a second enclosure attached to an underside of the second top plate and including a second bottom side formed with a second electrical connector protruding there through;

wherein the each of the first and second movable control panel modules is configured for interchangeable installation into a receiving port configuration;

a base unit formed with a left receiving port formed with the receiving port configuration and having a third electrical connector disposed therein and wherein the third electrical connector is configured to interface with either one of said first and said second electrical connectors, and wherein the base unit is formed with a right receiving port formed with the receiving port configuration and having a fourth electrical connector disposed therein and wherein the fourth electrical connector is configured to interface with either one of said first and said second electrical connectors; and, a PC board installed in the base unit for controlling the function of the lap top control unit, said PC board being interconnected with the third electrical connector, the fourth electrical connector and further wherein the PC board is in communication with the electronic control unit.

23. The sensor system of claim 22 wherein the said base unit further comprises a third fixed control panel module positioned in a center position between said left receiving port and said right receiving port and further wherein the third fixed control panel module is interconnected with the PCB.

24. The sensor system of claim 22 wherein the primary control element comprises a two-axis joystick actuator extending vertically upward from the first control panel surface and configured to direct said pointing direction.

25. The sensor system of claim 22 wherein said secondary control element comprises a left control actuator and a right control actuator positioned on a left and a right side of the second control panel, with each of the left and right control actuators being configured to perform the same control function, and wherein said sensor system is configured to activate only the left control actuator when the second movable control module is installed in said left receiving port, and to activate only the right control actuator when the second movable control module is installed in said right receiving port.

26. The sensor system of claim 22:
- wherein said third electrical connector comprises a multi-port electrical connector with a first set of ports configured to interface with said first movable control panel module and a second set of ports configured to interface with said second movable module; and,
- wherein said fourth electrical connector comprises a multi-port electrical connector with a first set of ports configured to interface with said first movable control panel module and a second set of ports configured to interface with said second movable module.

27. The sensor system of claim 22 wherein each of said electronic control unit and said PCB includes a transmitter and a receiver configured for transmitting and receiving command signals between the electronic control unit and the PCB by a wireless communication interface.

28. The sensor system of claim 22 wherein said payload further includes a radiation emitter for emitting a radiation beam substantially coincident with said pointing direction.

29. The sensor system of claim 22 further comprising a display device in communication with the electronic control unit for displaying an image in accordance with the image signals.

30. The sensor system of claim 7 further comprising a second actuator protruding from the handle narrow portion and wherein the second actuator is positioned on the handle for convenient actuation by the gripping hand index finger.

31. The sensor element of claim 6 wherein the first actuator comprises a two-direction trigger style actuator for controlling the size of the field of view of the payload sensor.

32. The sensor element of claim 31 wherein the second actuator comprises a push button style actuator.

33. The sensor system of claim 22 wherein the secondary control element comprises a joystick actuator extending vertically upward from the second control panel surface for controlling the field of view of the sensor payload.

* * * * *